US008005652B2

(12) United States Patent
Unal et al.

(10) Patent No.: US 8,005,652 B2
(45) Date of Patent: Aug. 23, 2011

(54) METHOD AND APPARATUS FOR SURFACE PARTITIONING USING GEODESIC DISTANCE

(75) Inventors: Gozde Unal, West Windsor, NJ (US); Gregory G. Slabaugh, Princeton, NJ (US); Tong Fang, Morganville, NJ (US)

(73) Assignee: Siemens Corporation, Iselin, NJ (US)

( * ) Notice: Subject to any disclaimer, the term of this patent is extended or adjusted under 35 U.S.C. 154(b) by 1142 days.

(21) Appl. No.: 11/466,149

(22) Filed: Aug. 22, 2006

(65) Prior Publication Data

US 2007/0050073 A1 Mar. 1, 2007

Related U.S. Application Data

(60) Provisional application No. 60/712,774, filed on Aug. 31, 2005.

(51) Int. Cl.
*G06F 7/60* (2006.01)
*G06F 17/50* (2006.01)

(52) U.S. Cl. ........................................ 703/2; 703/1

(58) Field of Classification Search ...... 703/2; 381/322, 381/328
See application file for complete search history.

(56) References Cited

U.S. PATENT DOCUMENTS

2003/0020710 A1* 1/2003 Biermann et al. ............ 345/420
2004/0076313 A1* 4/2004 Bronstein et al. ............ 382/118
2004/0165740 A1 8/2004 Fang et al.
2005/0110791 A1* 5/2005 Krishnamoorthy et al. .. 345/419

OTHER PUBLICATIONS

Wang et al., Shape-Based 3D Surface Correspondence Using Geodesics and Local Geometry, 2000, Yale University.*
S. Belongie, et al., "Shape Matching and Object Recognition Using Shape Contexts", IEEE Transactions on Pattern Analysis and Machine Intelligence, vol. 24, No. 24, Apr. 2002, pp. 509-522.
A. B. Hanza, et at., "Geodesic Object Representation and Recognition", Department of Electrical and Computer Engineering, Springer-Verlag, 2003, pp. 378-387.
M. Hilaga, et al., "Topology Matching for Fully Automatic Similarity Estimation of 3D Shapes", Proc. of the 28th Annual Conference on Computer Graphics and Interactive Techniques, 2001, pp. 203-212.
Y. Shinagawa, et al., "Surface Coding Based on Morse Theory", IEEE Computer Graphics and Applications, vol. 11, Issue 5, 1991, pp. 65-78.
T. Tung, et al., "Augmented Reeb Graphs for Content-Based Retrieval of 3D Mesh Models", Proceedings Shape Modeling Applications, 2004, pp. 157-166.
M. Kôrtgen, et al., "3D Shape Matching with 3D Shape Contexts", Proc. of the 7th Central European Seminar on Computer Graphics, Slovakia, Apr. 23, 2003.

* cited by examiner

*Primary Examiner* — Paul Rodriguez
*Assistant Examiner* — Aniss Chad

(57) ABSTRACT

An improved method of designing hearing aid molds is disclosed whereby regions of an ear impression model are identified as a function of a geodesic distance measure. According to a first embodiment, a canal point of an ear impression model is identified as that point having a maximum normalized geodesic distance as compared to all other points on the surface of the ear impression model. According to a second embodiment, a helix point of the ear impression model is identified as that point having a maximum normalized geodesic distance as compared to all points except those points in the canal region of the ear impression model. Finally, in accordance with another embodiment, a geodesic distance between a canal point and a helix point of an ear impression model is identified and a percentage threshold, illustratively 65%, is applied to that geodesic distance to identify a crus region.

38 Claims, 6 Drawing Sheets

METHOD AND APPARATUS FOR SURFACE PARTITIONING USING GEODESIC DISTANCE

This patent application claims the benefit of U.S. Provisional Application No. 60/712,774, filed Aug. 31, 2005, which is hereby incorporated by reference herein in its entirety.

BACKGROUND OF THE INVENTION

The present invention relates generally to the identification of features on three-dimensional objects and, more particularly, to the partitioning of a three-dimensional surface to identify features on that surface.

The manufacturing of medical devices designed to conform to anatomical shapes, such as hearing aids, has traditionally been a manually intensive process due to the complexity of the shape of the devices. FIG. 1A shows a diagram of a human ear that is, for example, the ear of a patient requiring a hearing aid. Specifically, ear 100 has various identifiable parts, or features, such as, for example, aperture 102, crus 103, canal 104, concha 105 and cymba 106. As one skilled in the art will recognize, in order to produce a hearing aid for the patient, an ear impression is typically taken. Various processes for taking such ear impressions have been developed, but most such processes typically involve inserting a pliable material into an ear and allowing that material to harden so that, when it is removed, the contours of the different parts of the ear, such as parts 102-106 of FIG. 1A, are accurately reflected on the impression. Such an ear impression reflecting the parts of ear 100 of FIG. 1A is shown in FIG. 1B. More particularly, ear impression 101 has aperture portion 102A corresponding to aperture 102 of FIG. 1A; crus portion 103A corresponding to crus 103 of FIG. 1A; canal portion 104A corresponding to canal 104 in FIG. 1A; concha portion 105A corresponding to concha 105 of FIG. 1A; cymba portion 106A corresponding to cymba 106; and lower body portion 107A.

Different methods have been used to create ear molds, or shells, from ear impressions. One skilled in the art will recognize that the terms ear mold and ear shell are used interchangeably and refer to the housing that is designed to be inserted into an ear and which contains the electronics of a hearing aid. Traditional methods of manufacturing such hearing aid shells typically require significant manual processing to fit the hearing aid to a patient's ear by, for example, manually identifying the various features of each ear impression. Then, an ear mold could be created by sanding or otherwise removing material from the shell in order to permit it to conform better to the patient's ear. More recently, however, attempts have been made to create more automated manufacturing methods for hearing aid shells. In some such attempts, ear impressions are digitized and then entered into a computer for processing and editing. The result is a digitized model of the ear impressions that can then be digitally manipulated. One way of obtaining such a digitized model uses a three-dimensional laser scanner, which is well known in the art, to scan the surface of the impression both horizontally and vertically. The result of such scanning is a digitized model of the ear impression having a plurality of points, referred to herein as a point cloud representation, forming a graphical image of the impression in three-dimensional space. FIG. 2 shows an illustrative point cloud graphical representation 201 of the hearing aid impression 101 of FIG. 1B. As one skilled in the art will recognize, the number of points in this graphical point cloud representation is directly proportional to the resolution of the laser scanning process used to scan the impression. For example, such scanning may produce a point cloud representation of a typical ear impression that has 30,000 points.

Once such a digitized model of an ear shell has been thus created, then various computer-based software tools have been used to manually edit the graphical shape of each ear impression individually to, for example, create a model of a desired type of hearing aid for that ear. As one skilled in the art will recognize, such types of hearing aids may include in-the-ear (ITE) hearing aids, in-the-canal (ITC) hearing aids, completely-in-the-canal (CIC) hearing aids and other types of hearing aids. Each type of hearing aid requires different editing of the graphical model in order to create an image of a desired hearing aid shell size and shape according to various requirements. These requirements may originate from a physician, from the size of the electronic hearing aid components to be inserted into the shell or, alternatively, may originate from a patient's desire for specific aesthetic and ergonomic properties.

Once the desired three-dimensional hearing aid shell design is obtained, various computer-controlled manufacturing methods, such as well known lithographic or laser-based manufacturing methods, are then used to manufacture a physical hearing aid shell conforming to the edited design out of a desired shell material such as, for example, a biocompatible polymer material.

SUMMARY OF THE INVENTION

The present inventors have recognized that, while the aforementioned methods for designing hearing aid shells are advantageous in many regards, they are also disadvantageous in some aspects. In particular, prior attempts at computer-assisted hearing aid manufacturing typically relied on the manual identification of the various features of each ear impression. Once these features were identified for each ear impression, then various editing procedures would be performed on the impression to create an ear mold. However, the manual identification of the various features of each ear impression to be edited was time consuming and costly.

Accordingly, the present inventors have invented an improved method of designing hearing aid molds whereby regions of an ear impression model are identified as a function of a geodesic distance measure. According to a first embodiment, a canal point of an ear impression model is identified as that point having a maximum normalized geodesic distance as compared to all other points on the surface of the ear impression model. A threshold, illustratively 0.85, is then applied to the maximum normalized geodesic distance to identify the canal region of the ear impression model. According to a second embodiment, a helix point of the ear impression model is identified as that point having a maximum normalized geodesic distance as compared to all points except those points in the canal region of said ear impression model. According to this embodiment, a threshold, once again illustratively 0.85, is then applied to the maximum normalized geodesic distance to identify the helix and anti-helix region of the ear impression model. Finally, in accordance with another embodiment, a geodesic distance between a canal point and a helix point of an ear impression model is identified and a percentage threshold, illustratively 65%, is applied to that geodesic distance. A contour line of said ear impression model corresponding to this percentage threshold is identified as a crus of said ear impression model. Thus, in accordance with the forgoing embodiments, features of an ear impression model can be automatically identified.

These and other advantages of the invention will be apparent to those of ordinary skill in the art by reference to the following detailed description and the accompanying drawings.

DETAILED DESCRIPTION

Figure 1A:
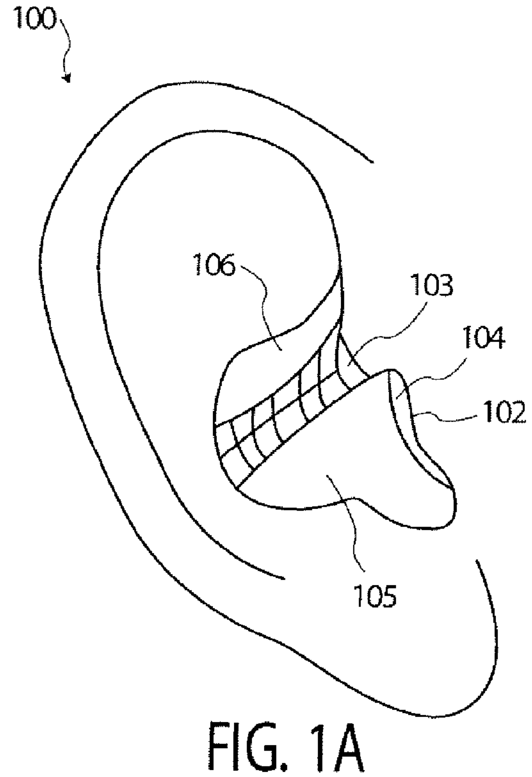
FIG. 1A shows a graphical depiction of an ear of a patient to be fitted with a hearing aid.
Figure 1B:
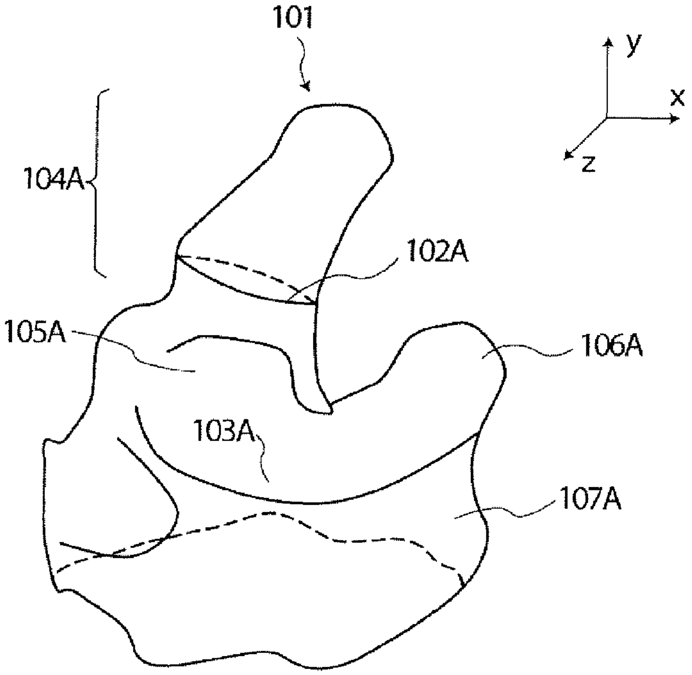
FIG. 1B shows a prior art ear impression taken of the ear of FIG. 1A.
Figure 2:
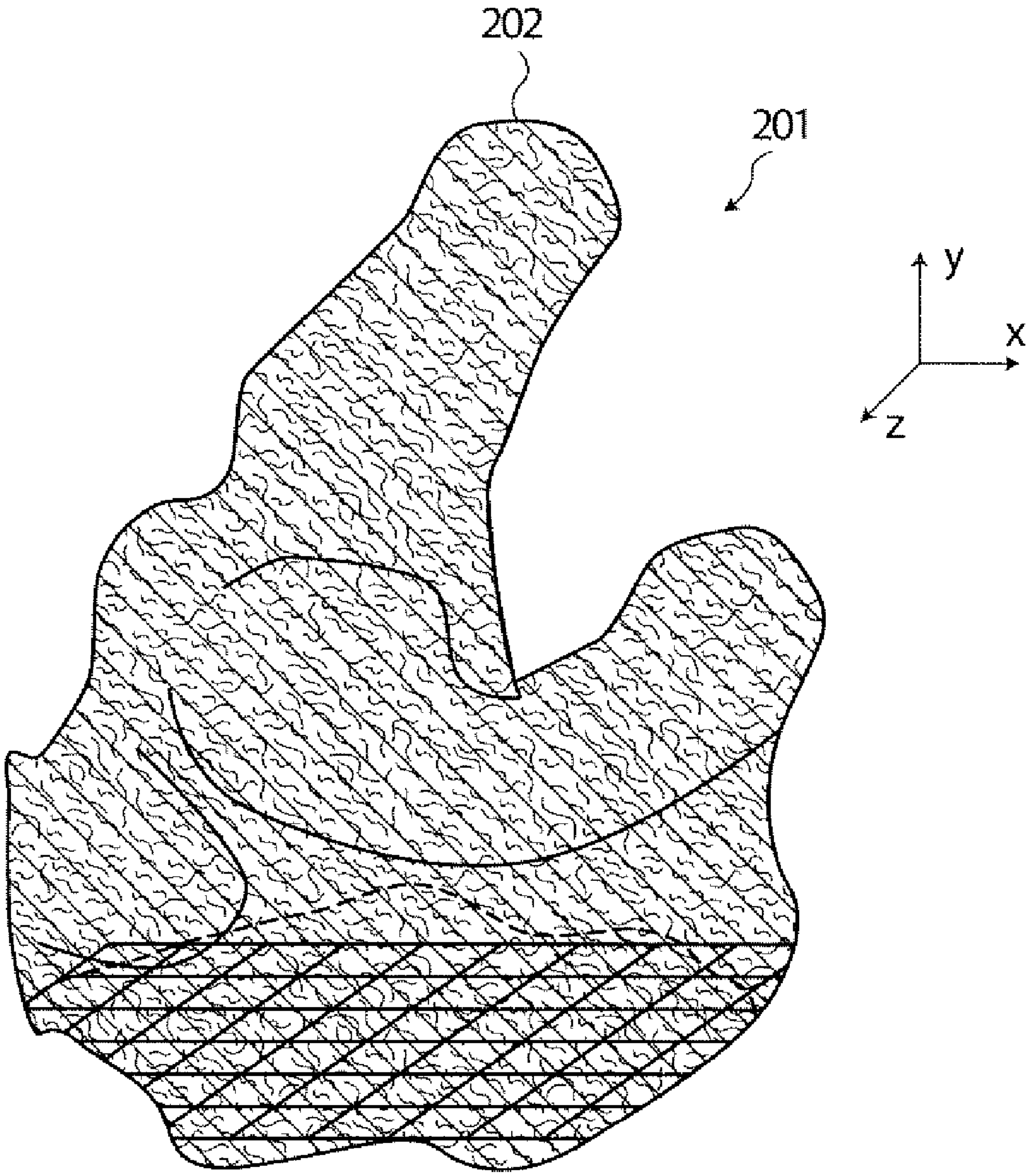
FIG. 2 shows a point cloud representation of the ear impression of FIG. 1B.

The present inventors have recognized that it is desirable to be able to automatically identify the various features of an ear impression in order to improve the design process of hearing aid shells. In particular, given a model of an ear impression, such as point cloud representation 201 in FIG. 2, it is desirable to be able to identify various feature areas on the surface of the model. These feature areas may be, illustratively, areas that correspond to the different anatomical features of an ear/ear impression, as discussed above in association with FIGS. 1A and 1B. Such an identification of the different features on an ear impression model would improve both the retrieval of individual ear impression models from large databases of such models and would improve the hearing aid manufacturing process by permitting fast, reliable and automatic feature detection and surface labeling of those features.

Therefore, the present inventors have invented a method and apparatus thereby the features on an ear impression model are recognized by using continuous functions such as those utilized in building Reeb graphs for object matching and retrieval. Such functions are useful for partitioning an object, such as an ear impression model, into different regions over the 3D surface of the model. As one skilled in the art will recognize, a Reeb graph is a topological graph defined as quotient space of a manifold which defines the skeleton of the manifold itself. As is well known, a manifold is an abstract mathematical space in which every point has a neighborhood which resembles Euclidean space, but in which the global structure may be more complicated. An ear impression model is one such example of a manifold. A Reeb graph is constructed by defining a continuous function $\mu$ over the surface of an object. The surface of the object is then divided into regions according to the values of $\mu$ and a node is associated with each point where regions are connected. A graph structure is then obtained by linking the nodes of the connected regions. Reeb graphs are well known and will not be described further herein other than is necessary for an understanding of the present invention.

Among the various types of continuous functions $\mu$ used in Reeb graph generation, one of the simplest and widest used examples is a height function. Specifically, such a height function $\mu_h$ will return a value of a z-coordinate (height) of a point v(x,y,z) on the surface S of an object according to the expression:

$$\mu_h(v(x,y,z))=z \quad \text{Equation 1}$$

Figure 3:
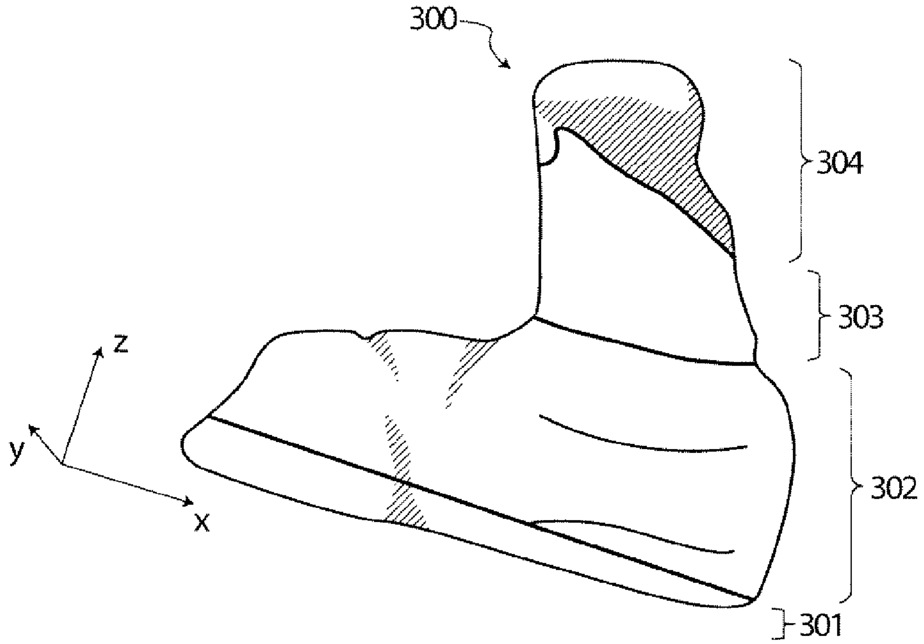
FIG. 3 shows how a height function can be applied to an ear impression model.

FIG. 3 shows such a height function as applied to the surface of an ear impression model. Specifically, as can be seen with reference to that figure, the height of each point on ear impression 300 along the z-axis is determined in a way such that different regions 301-304 can be identified on the impression. Here, illustratively, these regions can be identified by the average height of each of the points on a normalized scale of O to 1, with 1 being the highest point on the impression. For example, the points in region 301 correspond to an average value of $\mu_h$ (z-axis value) of 0.193, the points in region 302 correspond to an average value of 0.385 and the points in regions 303 and 304 correspond to average values of 0.578 and 0.770, respectively. Thus, one potential method of characterizing an ear impression is by simply determining the relative height of the points on the surface of an ear impression by calculating $\mu_h$ for each of those points. However, as one skilled in the art will recognize, one disadvantage of such a height function is that it is not invariant to transformations such as object rotation (i.e., when an object is rotated, the results obtained from calculated $\mu_h$ will change). Thus, in order to obtain meaningful feature identification for the purposes of, for example, searching a database of ear impression models, all models stored in the database would have to be aligned with each other. However, even if, for example, the bottom planes of all ear impressions were aligned such that x=y=0, the height function $\mu_h$ could still exhibit rotation-variant features. As a result, such a simplistic height function $\mu_h$ is typically insufficient to produce an accurate identification of features on an ear impression model that can be used, for example, in a search for a particular ear impression in a database of ear impression models.

The present inventors have recognized, therefore, that an improved continuous function $\mu$ can be identified that will overcome the forgoing rotation-variance problem. Specifically, by using a geodesic distance measure for each point on the surface of a model, a relatively accurate description of the model can be constructed that does not vary with rotation. As is generally well-known and as used herein, the term geodesic distance is defined as the distance confined to the surface between two points on the surface of an object, such as an ear impression model. The integral geodesic measure is the cumulative distance between a point on the surface of an object, such as an ear impression model, and all other points on that surface. A function $\mu$ incorporating such a geodesic distance component can be defined for each point von the surface S of an ear impression model as:

$$\mu(v) = \int_{p \in S} g(v, p)\, dS \quad \text{Equation 2}$$

where the function g(v,p) is defined as the geodesic distance between point v and point p on surface S. Since μ(v) of Equation 2 is an integral of the geodesic distance from v to all points on S, a small value means that, on average, a distance from v to an arbitrary point on the surface S is relatively small and, therefore, v is nearer the center of the ear impression. However, one skilled in the art will recognize that Equation 2, while invariant with respect to rotation, is not invariant if the object is scaled (either scaled larger or smaller). Thus, a rotation-invarient and scale-invariant function can be defined by normalizing Equation 2 according to the function:

$$\mu_g(v) = \frac{\mu(v) - \min_{p \in S} \mu(p)}{\max_{p \in S} \mu(p)} \quad \text{Equation 3}$$

where the variables are as described herein above.

Figure 4:
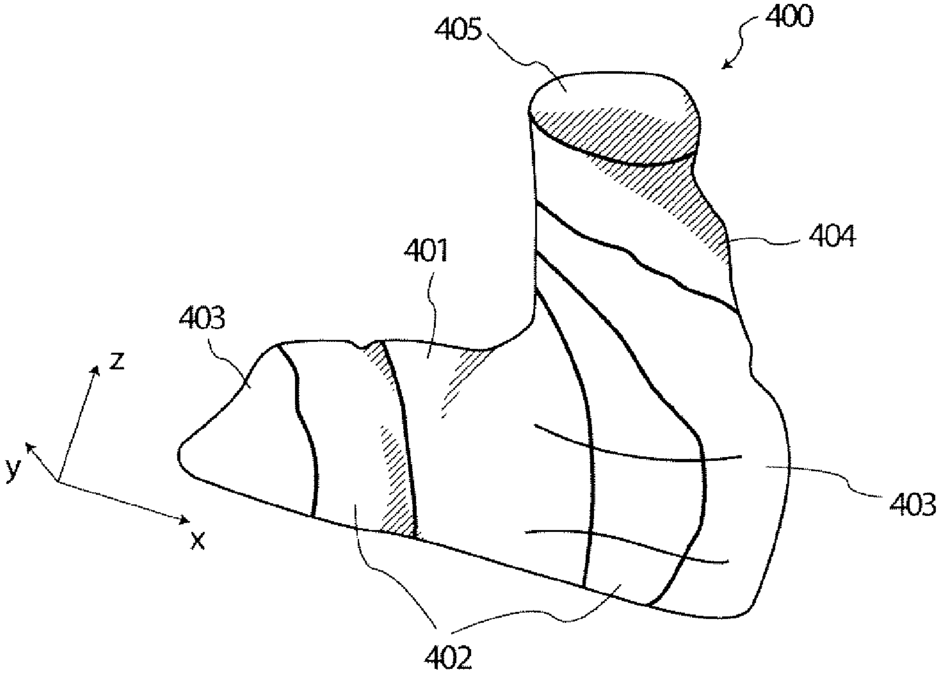
FIG. 4 shows how a geodesic distance measure can be applied to an ear impression model to produce a transformation and scale invariant characterization of the regions of the model.

FIG. 4 shows an illustrative ear impression model 400 whereby Equation 3 has been applied to each point on the surface of the impression. Specifically, surface regions 401-405 can be categorized as a function of the normalized geodesic distance of the points on the surface to all other points. For example, in the illustrative embodiment of FIG. 4, once Equation 3 has been applied, points in region 401 have the smallest value of $\mu_g(v)$ of, on average, 0.000-0.100, indicating that points in that region are closest to the center of the ear impression. Points in regions 402 have, illustratively, a value of $\mu_g(v)$ of, on average, 0.243. Points in regions 403 have a value of 0.486, and points in regions 404 and 405 have values of $\mu_g(v)$, on average, of 0.729 and 0.972, respectively, indicating that those regions are furthest from the center of the ear impression.

Figure 5:
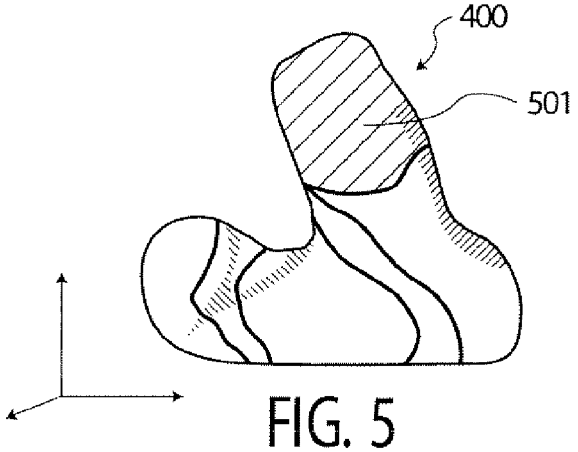
FIG. 5 shows how a canal portion of an ear impression model can be identified as a function of a geodesic distance measure.

As described herein above, identifying the relative geodesic distance of various regions on the surface of an ear impression model is useful as, for example, a search key for a particular ear impression model or class of ear impression models in a database of ear impressions models. However, the present inventors have recognized that such a relative geodesic distance measure can also be used to identify specific regions on an ear shell, such as the anatomical regions of an ear impression discussed above in association with FIGS. 1A and 1B. Specifically, the canal of an ear impression will typically be the point having the maximum geodesic distance value. Thus, the canal point can be identified according to the expression:

$$P_c = \underset{p \in S}{\operatorname{argmax}} \mu_g(p) \quad \text{Equation 4}$$

where, once again, the variables are as described herein above. Then, starting from this point, the canal region $R_c$ can be identified by, illustratively, applying a canal threshold $\theta_c$ to $\mu_g(v)$. As one skilled in the art will recognize, such a threshold may be selected according to particular characteristics of an ear impression model that may define different classes of ear impressions. Illustratively, $\theta_c$ can be generally set in many cases to $\theta_c$=0.85 to identify the canal portion of an ear impression model with acceptable accuracy. As used herein, the term threshold is defined as any criterion used to identify a limit of a region on a surface, such as a canal on an ear impression model. As one skilled in the art will recognize, if the point having the maximum geodesic distance is defined as a normalized geodesic distance of 1.00, then applying a threshold of 0.85 to said maximum geodesic distance, starting from $P_c$ and growing the surface partition using, for example, fast marching, will result in all points on the surface having a normalized geodesic distance greater than 0.85 being identified as on the canal portion of the ear impression model. One skilled in the art will recognize that fast marching is a well known technique for growing a surface in such a manner. As such, fast marching will not be discussed further herein other than is necessary for an understanding of the principles of the present invention. FIG. 5 shows illustratively how the 0.85 threshold applied to the canal point of ear impression 400 will produce canal area 501.

Figure 6:
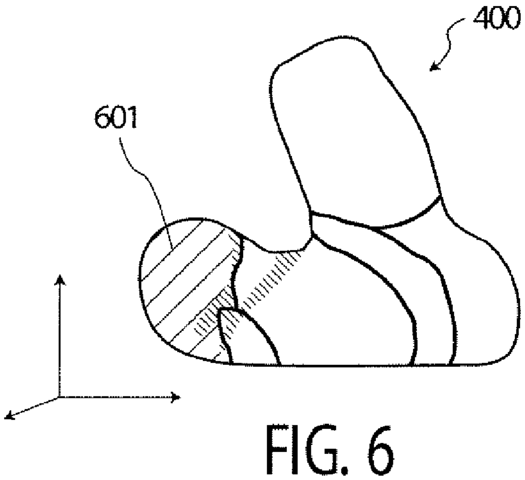
FIG. 6 shows how a helix and anti-helix portion of an ear impression model can be identified as a function of a geodesic distance measure.

Once the canal portion of an ear impression model has been identified, then the helix region of the ear impression model can also be identified using the expression of Equation 4 by excluding the points in the canal portion of the ear impression. Thus, the helix point of the ear impression model is identified according to the expression:

$$P_h = \underset{p \in (S - R_c)}{\operatorname{argmax}} \mu_g(p) \quad \text{Equation 5}$$

where the variables are as described herein above. Such an identification is possible since the helix portion of the ear impression model will generally have the greatest normalized geodesic distance measure after the canal and, therefore, by excluding the canal region, the helix point will be the next maximum value of $\mu_g(p)$. Then, once again, starting from this point $P_h$, and growing the surface partition by fast marching, the helix/anti-helix region $R_h$ can be identified by applying a helix threshold $\theta_h$ to $\mu_g(v)$. As is similar with the example of determining the canal region, discussed above, such a threshold may be selected according to the particular characteristics of an ear impression model that may define different classes of ear impressions. However, illustratively, $\theta_h$ can once again be generally set at $\theta_h$=0.85 to identify the helix/anti-helix portion of an ear impression model with acceptable accuracy in many instances. FIG. 6 shows illustratively how the 0.85 threshold applied to the helix point of ear impression 400 will identify helix/anti-helix area 601.

Figure 7:
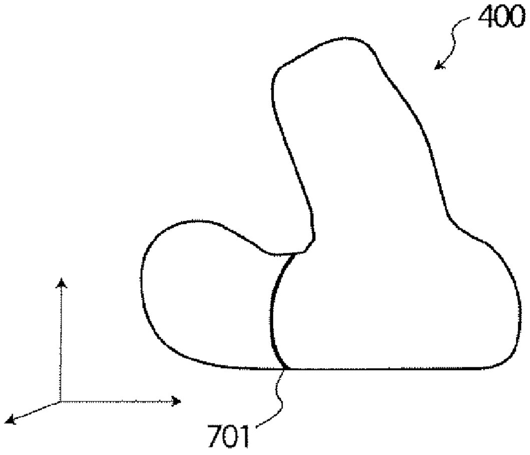
FIG. 7 shows how a crus portion of an ear impression model can be identified as a function of a geodesic distance measure between a canal point and a helix point of said ear impression model.

The canal point $P_c$ and the helix point $P_h$ represent two local geodesic distance maximums of $\mu_g(v)$ across ear impression 400 of FIG. 4. Thus, in accordance with another embodiment, the crus line of the ear impression can be defined by finding a particular contour line that is geodesically a desired percentage of the distance between these two points. Such a determination will divide the ear impression model into two halves, where the crus of the ear impression model lies on the dividing line. Illustratively, the desired percentage in many instances may be advantageously set as 65%. Accordingly, the contour that is geodesically 65% of the way from the canal point to the helix point can be accurately identified in many illustrative examples as the crus of the ear impression model. FIG. 7 shows the crus 701 of ear impression 400 identified in this manner. Thus, as described herein above, various regions of an ear impression model, such as the canal, helix/anti-helix and crus regions, can be advantageously identified and labeled.

Figure 8:
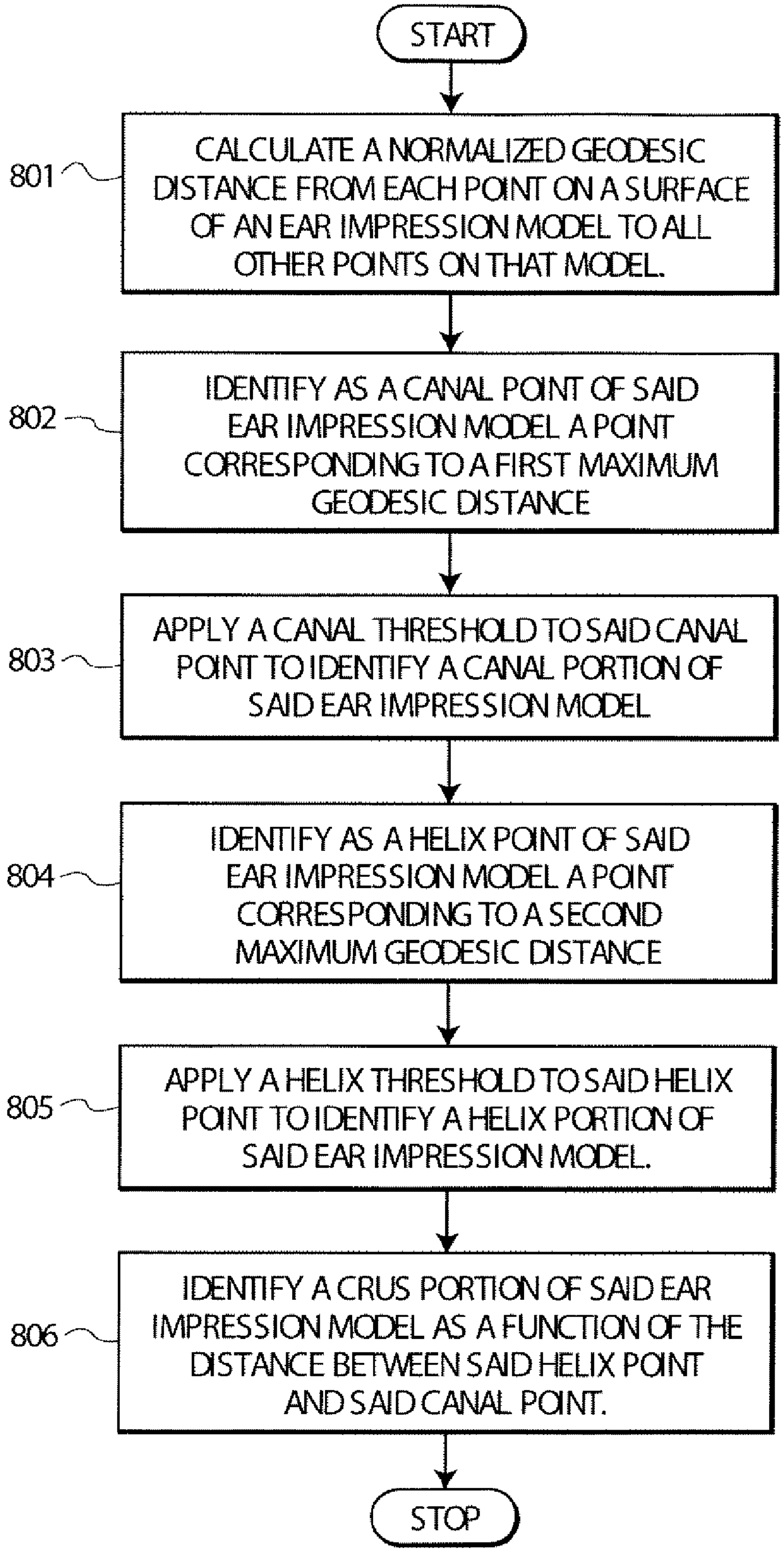
FIG. 8 is a flow chart showing the steps of a method in accordance with an embodiment of the present invention.

FIG. 8 shows a method in accordance with one illustrative embodiment of the present invention described herein above. Referring to that figure, at step 801, a normalized cumulative geodesic distance from each point on the surface of an ear impression to all other points on the surface is calculated. Then, at step 802, a canal point of said ear impression is identified as that point having the maximum geodesic distance. Next, at step 803, a canal threshold is applied to the canal point and a fast marching procedure is applied until the canal threshold value of the cumulative geodesic distance is met, to identify a canal portion of said ear impression model. Once the canal portion has been identified, then at step 804, a helix point can be identified as the point corresponding to the maximum geodesic distance when the points in the canal portion of the ear impression are excluded. At step 805, a helix threshold is applied to the helix point and a fast marching procedure is applied until the helix threshold value of the cumulative geodesic distance is met, to identify a helix/anti-helix portion of the ear impression model. Finally, at step 806, once both the helix point and the canal point have been identified, a crus portion of the ear impression model can be identified as the result of two fast marching procedures: one starting from the canal partition and the second from starting from the helix/anti-helix partition. The result of such procedures is a contour line corresponding to a percentage of the geodesic distance between the canal point and the helix point.

The present inventors have recognized that, in addition to using fast marching procedures as described above, such a procedure to grow and label regions on the surface can be improved by using local surface measures, such as surface curvature, in addition to the cumulative geodesic distance measure, which is a global measure. For example, for the purpose of the labeling of the crus region, as the algorithm fast marches from the canal and helix/anti-helix regions towards the crus, the curvature can be used as an indicator to slow down the fast marching, since the crus region has distinctive curvature characteristics.

Figure 9:
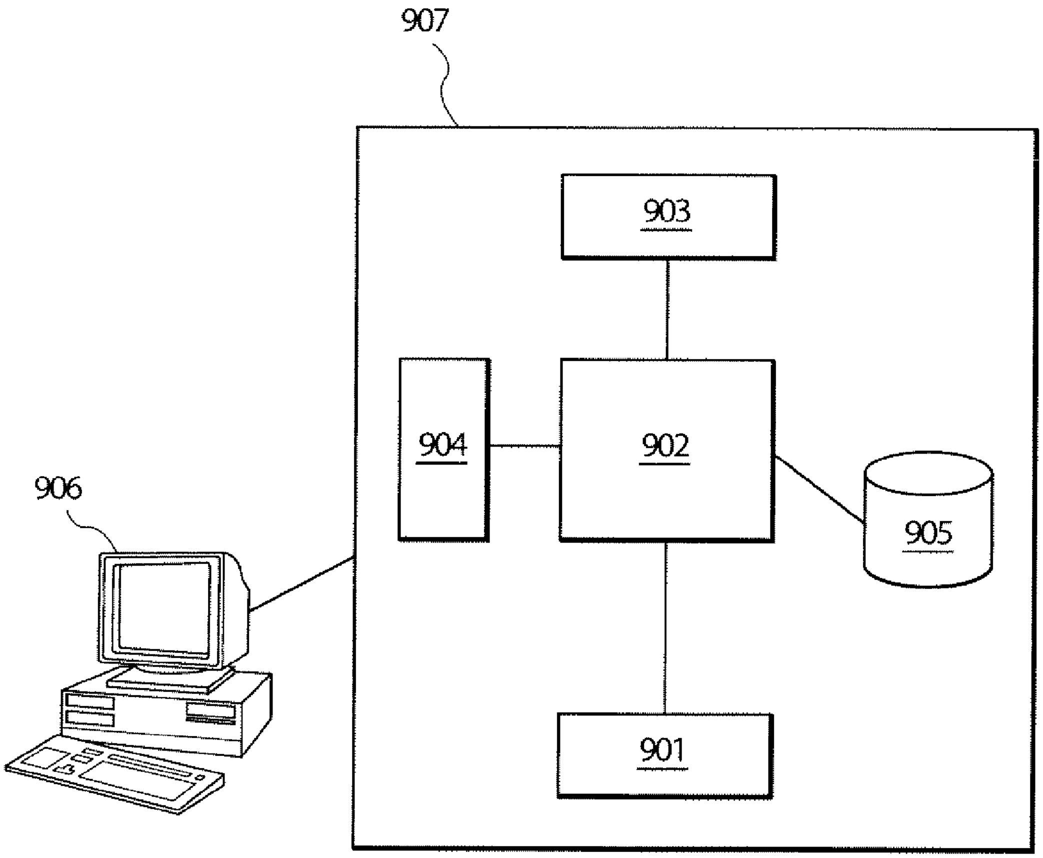
FIG. 9 shows a computer adapted to perform the illustrative steps of the method of FIG. 8 as well as other functions associated with the labeling of regions of ear impression models.

The foregoing embodiments are generally described in terms of identifying and manipulating objects, such as points on the surface of an ear impression and geodesic distances between those points, to identify features corresponding to the points on that surface, and partition the surface into different anatomical regions. One skilled in the art will recognize that such manipulations may be, in various embodiments, virtual manipulations accomplished in the memory or other circuitry/hardware of an illustrative registration system. One skilled in the art will recognize that such manipulations may be, in various embodiments, virtual manipulations accomplished in the memory or other circuitry/hardware of an illustrative computer aided design (CAD) system. Such a CAD system may be adapted to perform these manipulations, as well as to perform various methods in accordance with the above-described embodiments, using a programmable computer running software adapted to perform such virtual manipulations and methods. An illustrative programmable computer useful for these purposes is shown in FIG. 9. Referring to that figure, a CAD system 907 is implemented on a suitable computer adapted to receive, store and transmit data such as the aforementioned feature information associated a point cloud representation of an ear impression. Specifically, illustrative CAD system 907 may have, for example, a processor 902 (or multiple processors) which controls the overall operation of the CAD system 907. Such operation is defined by computer program instructions stored in a memory 903 and executed by processor 902. The memory 903 may be any type of computer readable medium, including without limitation electronic, magnetic, or optical media. Further, while one memory unit 903 is shown in FIG. 9, it is to be understood that memory unit 903 could comprise multiple memory units, with such memory units comprising any type of memory. CAD system 907 also comprises illustrative modem 901 and network interface 904. CAD system 907 also illustratively comprises a storage medium, such as a computer hard disk drive 905 for storing, for example, data and computer programs adapted for use in accordance with the principles of the present invention as described hereinabove. Finally, CAD system 907 also illustratively comprises one or more input/output devices, represented in FIG. 9 as terminal 906, for allowing interaction with, for example, a technician or database administrator. One skilled in the art will recognize that CAD system 907 is merely illustrative in nature and that various hardware and software components may be adapted for equally advantageous use in a computer in accordance with the principles of the present invention.

One skilled in the art will also recognize that the software stored in the computer system of FIG. 9 may be adapted to perform various tasks in accordance with the principles of the present invention. In particular, such software may be graphical software adapted to import surface models of shapes, for example those models generated from three-dimensional laser scanning of objects. In addition, such software may allow for the automatic calculation of geodesic distances of all points on the surface of an ear impression model to automatically identify the features on that model. The software of a computer-based system such as CAD system 907 may also be adapted to perform other functions which will be obvious in light of the teachings herein. All such functions are intended to be contemplated by these teachings.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. A method comprising:

calculating, by a processor, a geodesic distance measure associated with each of a plurality of points on a surface of an ear impression model;

identifying, by a processor, a first point corresponding to a first anatomical feature of the ear impression model as a point having a maximum geodesic distance measure of said plurality of points; and identifying, by a processor, a first region, corresponding to the first anatomical feature, on said surface of the ear impression model as a function of the geodesic distance measure of said first point.

2. The method of claim 1 wherein said geodesic distance is determined by the expression:

$$\mu(v) = \int_{p \in S} g(v, p)\, dS$$

where $\mu(v)$ is the cumulative geodesic distance for point v; and g(v,p) is the geodesic distance between point v and point p on surface S.

3. The method of claim 1 wherein said geodesic distance is determined by the expression:

$$\mu_g(v) = \frac{\mu(v) - \min_{p\in S}\mu(p)}{\max_{p\in S}\mu(p)}$$

where $\mu_g(v)$ is the normalized geodesic distance for point v, $\mu(v)$ is the cumulative geodesic distance for point v, $\min_{p\in S}\mu(p)$ is the minimum geodesic distance for all points p on surface S; and $\max_{p\in S}\mu(p)$ is the maximum geodesic distance for all points p on surface S.

4. The method of claim 1 wherein said step of identifying a first region comprises using a local feature of said surface to identify said first region.

5. The method of claim 4 wherein said local feature comprises a curvature of a portion of said surface.

6. The method of claim 1 wherein said step of identifying a first region comprises:

applying a threshold to a value of said the geodesic distance for said first point.

7. The method of claim 6 wherein said step of applying a threshold comprises using a region growing procedure to identify said first region.

8. The method of claim 7 wherein said region growing procedure comprises a fast marching procedure.

9. The method of claim 6 wherein said first region comprises a canal region of the ear impression model.

10. The method of claim 9 wherein said first point comprises a canal point of said canal region, said canal point having the maximum geodesic distance relative to all points on said surface of said ear impression model.

11. The method of claim 10 wherein said canal point is determined according to the expression:

$$P_c = \underset{p\in S}{\operatorname{argmax}}\,\mu_g(p)$$

where $P_c$ is the canal point; and $\mu_g(p)$ is the normalized geodesic distance for point p on surface S.

12. The method of claim 6 wherein said first region comprises a helix region of the ear impression model.

13. The method of claim 12 wherein said first point comprises a helix point of said helix region, said helix point having the maximum geodesic distance relative to all points other than points in a canal region on said surface of said ear impression model.

14. The method of claim 13 wherein said helix point is determined according to the expression:

$$P_h = \underset{p\in(S-R_c)}{\operatorname{argmax}}\,\mu_g(p)$$

where $P_h$ is the canal point; $R_c$ represents the points on the surface in the canal region and $\mu_g(p)$ is the normalized geodesic distance for point p on surface S.

15. The method of claim 6 wherein said step of applying a threshold comprises multiplying a value corresponding to the geodesic distance of said first point by a predetermined threshold value.

16. The method of claim 15 wherein said predetermined threshold value is 0.85.

17. The method of claim 6 further comprising:

identifying a second point on said surface corresponding to a second anatomical feature of the ear impression model as a point having a maximum geodesic distance of ones of said plurality of points not within said first region;

applying a second threshold to a geodesic distance from said first point to said second point; and identifying a second region as a function of said second threshold.

18. The method of claim 17 wherein said second threshold is 0.65.

19. The method of claim 17 wherein said second region comprises a crus region of the ear impression model.

20. An apparatus comprising:

means for calculating a geodesic distance measure associated with each of a plurality of points on a surface of an ear impression model;

means for identifying a first point corresponding to a first anatomical feature of the ear impression model as a point having a maximum geodesic distance measure of said plurality of points; and means for identifying a first region, corresponding to the first anatomical feature, on said surface of the ear impression model as a function of the geodesic distance measure of said first point.

21. The apparatus of claim 20 wherein said means for calculating comprises means for calculating said geodesic distances according to the expression:

$$\mu(v) = \int_{p\in S} g(v, p)\, dS$$

where $\mu(v)$ is the cumulative geodesic distance for point v; and g(v,p) is the geodesic distance between point v and point p on surface S.

22. The apparatus of claim 20 wherein said means for calculating comprises means for calculating said geodesic distances according to the expression:

$$\mu_g(v) = \frac{\mu(v) - \min_{p\in S}\mu(p)}{\max_{p\in S}\mu(p)}$$

where $\mu_g(v)$ is the normalized geodesic distance for point v, $\mu(v)$ is the cumulative geodesic distance for point v, $\min_{p\in S}\mu(p)$ is the minimum geodesic distance for all points p on surface S; and $\max_{p\in S}\mu(p)$ is the maximum geodesic distance for all points p on surface S.

23. The apparatus of claim 20 wherein said means for identifying a first region comprises means for using a local feature of said surface to identify said first region.

24. The apparatus of claim 23 wherein said local feature comprises a curvature of a portion of said surface.

25. The apparatus of claim 20 wherein said means for identifying a first region comprises:

means for applying a threshold to a value of the geodesic distance for said first point.

26. The apparatus of claim 25 wherein said means for applying a threshold comprises means for using a region growing procedure to identify said first region.

27. The apparatus of claim 26 wherein said region growing procedure comprises a fast marching procedure.

28. The apparatus of claim 25 wherein said first region comprises a canal region of the ear impression model.

29. The apparatus of claim 28 wherein said first point comprises a canal point of said canal region, said canal point having the maximum geodesic distance relative to all points on said surface of said ear impression model.

30. The apparatus of claim 29 further comprising:

means for calculating said canal point according to the expression:

$$P_c = \underset{p \in S}{\operatorname{argmax}} \mu_g(p)$$

where $P_c$ is the canal point; and $\mu_g(p)$ is the normalized geodesic distance for point p on surface S.

31. The apparatus of claim 25 wherein said first region comprises a helix region of the ear impression model.

32. The apparatus of claim 31 wherein said first point comprises a helix point of said helix region, said helix point having the maximum geodesic distance relative to all points other than points in a canal region on said surface of said ear impression model.

33. The apparatus of claim 32 further comprising:

means for determining said helix point according to the expression:

$$P_h = \underset{p \in (S - R_c)}{\operatorname{argmax}} \mu_g(p)$$

where $P_h$ is the canal point; $R_c$ represents the points on the surface in the canal region and $\mu_g(p)$ is the normalized geodesic distance for point p on surface S.

34. The apparatus of claim 25 wherein said means for applying a threshold comprises means for multiplying a value corresponding to the geodesic distance of said first point by a predetermined threshold value.

35. The apparatus of claim 34 wherein said predetermined threshold value is 0.85.

36. The apparatus of claim 25 further comprising:

means for identifying a second point on said surface corresponding to a second anatomical feature of the ear impression model as a point having a maximum geodesic distance of ones of the plurality of points not within said first region;

means for applying a second threshold to a geodesic distance from said first point to said second point; and means for identifying a second region as a function of said second threshold.

37. The apparatus of claim 36 wherein said second threshold is 0.65.

38. The apparatus of claim 36 wherein said second region comprises a crus region of an ear impression model.

* * * * *

UNITED STATES PATENT AND TRADEMARK OFFICE

CERTIFICATE OF CORRECTION

PATENT NO. : 8,005,652 B2
APPLICATION NO. : 11/466149
DATED : August 23, 2011
INVENTOR(S) : Gozde Unal et al.

It is certified that error appears in the above-identified patent and that said Letters Patent is hereby corrected as shown below:

Title Page

Please correct the title (54) to read:

METHOD AND APPARATUS FOR SURFACE PARTITIONING USING GEODESIC DISTANCE MEASURE

Signed and Sealed this
Twenty-second Day of November, 2011

David J. Kappos
*Director of the United States Patent and Trademark Office*

UNITED STATES PATENT AND TRADEMARK OFFICE

CERTIFICATE OF CORRECTION

PATENT NO. : 8,005,652 B2
APPLICATION NO. : 11/466149
DATED : August 23, 2011
INVENTOR(S) : Gozde Unal et al.

It is certified that error appears in the above-identified patent and that said Letters Patent is hereby corrected as shown below:

Title Page, Item (54) and at Column 1, lines 1-3,

Please correct the title to read:

METHOD AND APPARATUS FOR SURFACE PARTITIONING USING GEODESIC DISTANCE MEASURE

This certificate supersedes the Certificate of Correction issued November 22, 2011.

Signed and Sealed this
Third Day of January, 2012

David J. Kappos
*Director of the United States Patent and Trademark Office*